United States Patent
Gupta et al.

(10) Patent No.: US 9,779,529 B2
(45) Date of Patent: Oct. 3, 2017

(54) GENERATING MULTI-IMAGE CONTENT FOR ONLINE SERVICES USING A SINGLE IMAGE

(71) Applicant: Adobe Systems Incorporated, San Jose, CA (US)

(72) Inventors: Aman Gupta, Saharanpur U.P. (IN); Vikas Sharma, Lucknow U.P. (IN); Anmol Dhawan, Ghaziabad U.P. (IN)

(73) Assignee: Adobe Systems Incorporated, San Jose, CA (US)

( * ) Notice: Subject to any disclaimer, the term of this patent is extended or adjusted under 35 U.S.C. 154(b) by 19 days.

(21) Appl. No.: 14/627,859

(22) Filed: Feb. 20, 2015

(65) Prior Publication Data

US 2016/0247256 A1 Aug. 25, 2016

(51) Int. Cl.
*G06T 11/60* (2006.01)
*G06Q 50/00* (2012.01)

(52) U.S. Cl.
CPC .............. *G06T 11/60* (2013.01); *G06Q 50/01* (2013.01)

(58) Field of Classification Search
CPC ................................ G06T 11/60; G06Q 50/01
USPC ......................................................... 382/298
See application file for complete search history.

(56) References Cited

U.S. PATENT DOCUMENTS

2008/0166069 A1* 7/2008 Lin ........................... G06T 3/40
382/302
2009/0085921 A1* 4/2009 Do ........................... G09G 5/14
345/543

OTHER PUBLICATIONS

AP Social Media Image Maker—http://www.autreplanete.com/ap-social-media-image-maker/—Apr. 2013 Archive.*
TwiBack—https://web.archive.org/web/20091028053620/—2009 Archive.*
Screencast by TwiBack—https://www.youtube.com/watch?v=-T3gCgcym5E—2009 Video.*
Fotor, Photo Editor—Fotor—Free Online Photo Editing & Creatives, http://www.fotor.com, accessed Jan. 26, 2015, 3 pages.
Pagemodo, Facebook Cover Photos, Photo Editor, Custom Tabs & Constests Pagemodo, http://www.pagemodo.com, accessed Jan. 26, 2015, 2 pages.

(Continued)

*Primary Examiner* — Amandeep Saini
(74) *Attorney, Agent, or Firm* — Kilpatrick Townsend & Stockton LLP

(57) ABSTRACT

Systems and methods are provided for generating multi-image content for online services using a single image. For example, a processor identifies publishing constraints specified for image categories in a profile of an online service. The processor generates a first image by applying a first publishing constraint to a copy of an input image and generates a second image by applying a second publishing constraint to a selected portion of the first image. The processor presents the first and second images in different preview interfaces. The processor applies manipulation effects to the second image that modify the second image independently of modifications to the first image. The manipulation effect is applied to the second in accordance with the second publishing constraint for the second image. The processor uploads the images with the applied manipulation effects to the online service for presentation in the different image categories.

15 Claims, 10 Drawing Sheets

(56) References Cited

OTHER PUBLICATIONS

Timelinecoverbanner, Facebook Cover Photo—Timeline Cover Maker—Facebook Banner Creator, http://www.timelinecoverbanner.com, accessed Jan. 26, 2015, 1 page.
Coverphotoz, Facebook Covers—Facebook Cover Photos—Create Your Own Facebook Covers, http://coverphotoz.com, accessed Jan. 26, 2015, 4 pages.
Timeline Covers, Facebook Timeline Covers—Timeline Covers. Pro, http://www.timelinecovers.pro, accessed Jan. 26, 2015, 2 pages.
Coverbash, Facebook Covers, Timeline Cover, Facebook Profile Cover, Cover Photo, Facbook Cover, http://www.coverbash.com, accessed Jan. 26, 2015, 5 pages.

\* cited by examiner

```
<online_service-layout-size>         ← 202
    <layout-width>23.64</layout-width>
    <layout-height>9.56</layout-height>
</ online_service-layout-size>        ← 204
<online_service-cover_image>
    <profile_image-rect>              ← 206
        <rect-left>1.45</rect-left>
        <rect-right>5.12</rect-right>  ← 208
        <rect-top>4.89</rect-top>      ← 210
        <rect-bottom>1.12</rect-bottom> ← 212
    </profile_image-rect>
    <cover_image-rect>
        <rect-left>0</rect-left>       ← 214
        <rect-right>23.64</rect-right> ← 216
        <rect-top>9.56</rect-top>      ← 218
        <rect-bottom>0</rect-bottom>
    </cover_image-rect>                ← 220
</online_service-cover_image>
```

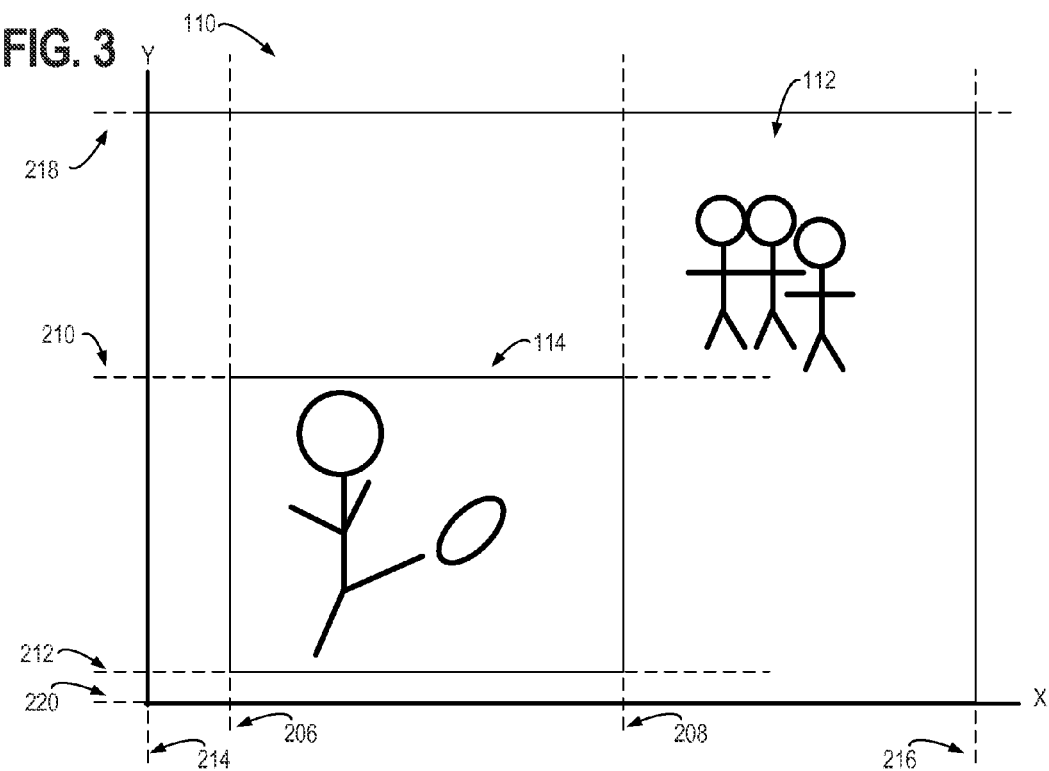

FIG. 3

GENERATING MULTI-IMAGE CONTENT FOR ONLINE SERVICES USING A SINGLE IMAGE

TECHNICAL FIELD

This disclosure relates generally to computer-implemented methods and systems and more particularly relates to generating multi-image content for online services using a single image.

BACKGROUND

Social media services allow sharing of online content among users via user profiles. Profiles for users of some social media services include cover images and profile images to represent users. Some users attempt to make their cover images and profile images visually attractive by applying image manipulation effects to these images.

Some prior solutions for creating cover images and profile images with applied visual effects present disadvantages. One example of a disadvantage is that some content editing applications lack preview interfaces that show how a given manipulation will affect the display of a cover image, a profile image, or a combination of the two images. Another example of a disadvantage is that some content editing applications do not provide optimal solutions for adjusting the sizes or shapes of images for a given social media service. For example, some social media services specify sizes for cover and profile images that allow the profile image to be properly aligned relative to the cover image. Manually modifying the sizes of images can result in sub-optimal or incorrect image sizes that are unsuitable for use in the social media service. Another example of a disadvantage is that some content editing applications utilize complex workflows for generating cover images or profile images. These complex workflows may discourage users from attempting to generate visually attractive cover images or profile images.

It is desirable to provide a simplified process for generating multi-image content (e.g., a cover image and a profile image) for social networking websites or other online services.

SUMMARY

According to certain embodiments, systems and methods are provided for generating multi-image content for online services using a single image. In accordance with some embodiments, a processor identifies publishing constraints applied to image categories (e.g., cover images, profile images) in a profile of an online service. In one example, the processor accesses canvases or other layouts from a third-party service that specify size constraints and/or other constraints imposed by a given social media service. The processor generates a first image by applying a first publishing constraint to an input image. The processor generates a second image by applying a second publishing constraint to a selected portion of the first image. The processor provides first and second preview interfaces for editing the respective first and second image. Using separate preview interfaces for presenting different images generated from the same input image can allow the images to be manipulated separately. For example, the processor applies, via the second preview interface, a manipulation effect that modifies the second image in a manner that is independent of modifications to the first image. The manipulation effect is applied in accordance with a publishing constraint for the online service. The processor uploads the images with one or more applied manipulation effects to the online service for presentation in the first and second image categories.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where:

FIG. 2 depicts an example of a file that specifies a layout for generating multi-image content according to certain exemplary embodiments;

FIG. 3 is a diagram depicting an example of content that is laid out in accordance with the example depicted in FIG. 2 according to certain exemplary embodiments;

DETAILED DESCRIPTION

Figure 1:
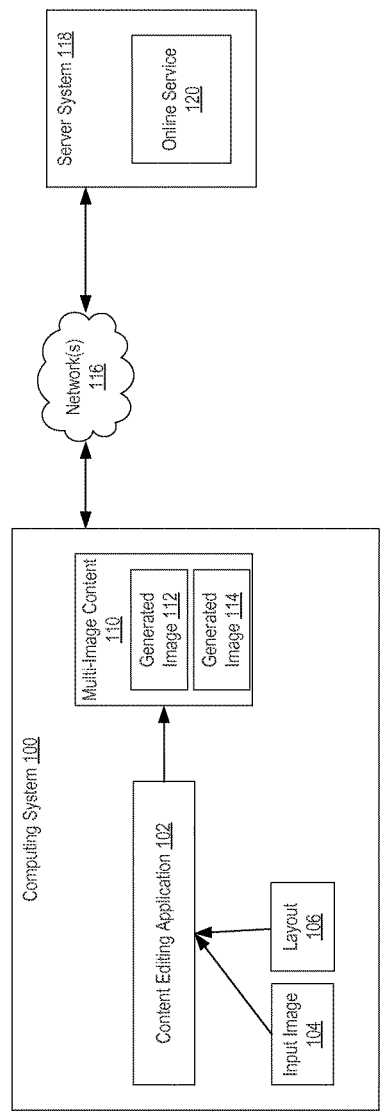
FIG. 1 is a block diagram depicting an example of a system for generating multi-image content for online services using a single image according to certain exemplary embodiments.

Improved systems and techniques are disclosed for creating images that will be used together according to publishing constraints. One embodiment creates a profile image and a cover image to be displayed together as part of a social media profile according to the social media website's profile image publishing constraints. Publishing constraints that specify how the images will be used together once published are used by an image creation application or other content editing application to create and preview the images.

For example, publishing constraints may specify sizes and shapes for profile images and cover images and may also specify that the profile image will be displayed overlapping a specific portion in the bottom left corner of the cover image. The publishing constraints are used to select appropriate portions of one or more input images that correspond to particular image size or shape constraints. In one example, a user identifies a single input image, and different portions of the content of that input image are identified, based on the publishing constraints, as two different images that will be used together (e.g., one image showing the entire group of friends depicted in the input image and the other image showing just the face of one of one person from the group in the input image). In some embodiments, automatically selecting appropriate image portions that correspond to particular image size or shape constraints reduces the time and complexity that would otherwise be involved in individually and manually creating images to be used together according to publishing constraints.

The following example is provided to help introduce the general subject matter of certain embodiments. A content manipulation application is used to generate multi-image content so that the multi-image content complies with certain publishing constraints of an online service. Content displayed by the online service can include a cover image and a profile image for a user profile in the online service. Examples of publishing constraints include sizes and shapes of the cover image and profile image as well as positions of the cover image and profile image. The publishing constraints are associated with the online service. For example, if the online service is a social media service, the publishing constraints (e.g., size, position, shape, etc. of cover and profile images) may be specific to the social media service such that different profiles in the social media service always present a cover image with certain dimensions in a first position and a profile image with certain dimensions in a second position. The content manipulation application (e.g., an application executed on a user device or an online service separate from the online service for which multi-image content is created) can access one or more files, such as XML files, that specify a layout for content as displayed by the online service. The files specify the layout by, for example, identifying sizes, shapes, positions, and/or other publishing constraints associated with the online service.

A first preview interface of the content manipulation application is used to select an input image on a user's computer that serves as the basis for the multi-image content. The content manipulation application automatically modifies the input image (or a copy of the input image) to satisfy one or more first publishing constraints for a first portion (e.g., a cover image) of the multi-image content to be uploaded to the online service (e.g., by cropping and/or resizing the input image). The modified first image portion is displayed in a first preview interface. In the first preview interface, another image portion is selected that will be a second portion of the multi-image content (e.g., a profile image) to be uploaded to the online service. For example, the content manipulation application copies the selected portion of the input image to a non-transitory computer-readable medium and opens the copied image portion in a second preview interface. The second preview interface automatically applies size and shape constraints to the copied image portion by, for example, cropping the image. Using a portion of the cover image to generate the profile image can allow a visual relationship between the two images to be easily discerned (e.g., because both images include similar content from the same input image).

The first and second preview interfaces allow a user to separately manipulate the first and second image portions (e.g., via rotation, cropping, color changes, etc.) independently from one another (e.g., such that any changes to the first image portion are saved to a first image file that includes the first image portion and any changes to the second image portion are saved to a second image file that includes the second image portion). The content manipulation application rejects or otherwise prevents the first and second image portions from being manipulated in a manner that would violate publishing constraints for the layout. After one or more of the first and second image portions have been modified by a user, the content manipulation application is used to combine first and second image portions into multi-image content (e.g., by positioning the first and second image portions in different layers of a multi-layer image, by replacing pixels of one of the image portions with pixels from the other image portion, etc.). The multi-image content is uploaded to the online service using the content manipulation application or another suitable application (e.g., a web browser used to access the online service).

A second distinguishing feature disclosed herein involves using the publishing constraints to provide a preview of the interaction of multiple images as they will appear together in published form, including any image specific effects that may be applied. In one example, a preview shows a profile image with a black and white effect applied and a cover image without the black and white effect applied. The ability to preview the interaction between two images (e.g., how they look overlapping or adjacent to one another) and the ability to add image-specific effects is accomplished using multiple layers in the content editing application. Each image is provided on a different layer of a multi-layer image so that effects can be individually applied to each image, while still allowing the images to be displayed together in a partially overlapping relationship. Unlike prior individual image editing techniques, such multi-image editing and preview capabilities allow an image creator to easily visualize and coordinate the interaction between multiple images by seeing how the images will be used together in the published content according to the publishing constraints, including how each of the images will appear with any image-specific effects applied. The user is able to apply effects to the images individually, but is also able to visualize how the images will appear together with those effects applied.

As used herein, the term "online service" is used to refer to one or more applications that are accessible via the Internet or other data networks. Examples of an online service include profiles for different users or other entities that are subscribed to the online service. An example of a profile includes one or more credentials for a user or other entity and content, such as images, that is associated with the user or other entity. At least some of the content in a profile is accessible to other users or entities having profiles with the online service. For example, image content associated with some profiles is accessible to at least some other users or entities having profiles with the online service (e.g., "friends" of a given user).

As used herein, the term "publishing constraint" is used to refer to any restrictions on one or more aspects of an image that control how the image is displayed via an online service. Examples of publishing constraints include, but are not limited to, dimensions of an image, placement of an image, color information for an image, etc.

As used herein, the term "image" is used to refer to any visual content that can be displayed via an online service. Examples of an image include a photograph, artwork, or some combination thereof.

As used herein, the term "manipulation effect" is used to refer to any modification to the visually displayed content of an image file.

The disclosed generation of multi-image content can allow users to apply manipulation effects to different types of images (e.g., cover images and profile images) used in social media services or other online services in a manner that reduces or eliminates complex workflows involved in creating different types of images. In some embodiments, the content editing application can provide a simplified process for generating multiple images for an online service to which complex image manipulation effects are applied. For example, the content editing application may reduce or eliminate the need for users to manually perform alignment and size-based calculations to generate a profile image and a cover image for an online service. In additional or alternative embodiments, the content editing application can provide an accurate preview of profile and/or cover images created for a social media service prior to uploading the images to the social media service.

In some embodiments, the content editing application uses modifiable layouts to identify publishing constraints associated with social media services or other online services. Examples of such layouts include (but are not limited to) one or more of files with information identifying publishing constraints for social media services, files with customizable themes generated by professional graphic designers, etc. In some embodiments, the layouts are provided by a third-party online service. In additional or alternative embodiments, the layouts are provided by an online service that includes the content editing application. In additional or alternative embodiments, the layouts are stored locally at a client machine executing the content editing application. The use of layouts can allow users to generate a complex creative output in a simplified manner. For example, the use of layouts that identify, specify, or otherwise indicate publishing constraints can allow the content editing application to automatically perform one or more calculations for modifying a profile image and/or cover image to comply with the publishing constraints of a social media service. The performance of the calculations by the content editing application can minimize or otherwise reduce a number of user inputs required.

In some embodiments, the content editing application is used for multiple social media services. In one example, the content editing application uses one or more layouts having one or more publishing constraints specific to a first online service for generating profile and/or cover images for the first online service, and the content editing application uses one or more layouts having one or more publishing constraints specific to a second online service for generating profile and/or cover images for the second online service.

Referring now to the drawings, FIG. 1 is a block diagram depicting an example of a system for generating multi-image content for online services using a single image. The system depicted in FIG. 1 includes a computing system 100 that executes a content editing application 102. The content editing application 102 accesses an input image 104 and a layout 106 to generate multi-image content 110. The multi-image content 110 depicted in FIG. 1 includes generated images 112, 114. The images 112, 114 depicted in FIG. 1 are generated from the same input image 104 using the layout 106. In various embodiments, the layout 106 is locally stored at the computing system 100, accessed from a third-party service over a data network, accessed from a shared network volume, or otherwise accessible to the computing system 100.

The layout 106 can include one or more files that include data specifying one or more characteristics of how content is displayed (e.g., sizes, shapes, positions, etc.). The layout 106 can be used to identify, for example, a placement of one or more of the profile image and the cover image, dimensions for one or more of the profile image and the cover image, and/or any other suitable characteristics of an image generated by the content editing application 102. In some embodiments, the layout 106 includes visual themes designed by professional designers or is used with a separate template file that includes such visual themes.

Although a single layout 106 is depicted for purposes of illustration, a layout can include multiple files that are used by the content editing application 102 to control the generation of different images for an online service. An example of a file used to specify a layout 106 is an XML file or other file suitable for describing characteristics of multi-layered images. The computing system 100 depicted in FIG. 1 communicates via one or more data networks 116 (e.g., the Internet) with a server system 118. The server system 118 depicted in FIG. 1 provides an online service, such as, but not limited to, a social media service. The layout 106 identifies, specifies, or otherwise indicates publishing constraints used by the online service 120 to present images from different image categories (e.g., cover images, profile images) in a profile of the online service 120. Examples of publishing constraints include dimensions for different categories of images (e.g., sizes of cover images, profile images, etc.), shapes for different categories of images (e.g., rectangular, circular, etc.), or any other image-related information that affects how images in a given category are displayed in a web page generated by the online service 120. The multi-image content 110 generated by the content editing application 102 complies with the publishing constraints of an online service 120.

For illustrative purposes, the content editing application 102 is described herein as using a single layout 106 for a single online service 120. However, any number of layouts can be used to specify publishing constraints for any number of online services. In one example, a first set of a layout 106 includes publishing constraints on profile and cover images for a first online service 120, and a second set of a layout 106 includes different publishing constraints on profile and cover images for a second online service 120.

FIG. 2 depicts an example of a layout 106 for generating multi-image content 110. The layout 106 can be defined using a suitable mark-up language, such as XML. The example depicted in FIG. 2 can be used to lay out different image portions of the multi-image content 110 for a social media service by specifying the placement of a cover image (i.e., generated image content 112) and a profile image (i.e., generated image content 114). As depicted in FIG. 2, the file specifying the layout 106 can include a width parameter 202 and can include a height parameter 204. The example depicted in FIG. 2 also includes parameters 206, 208, 210, 212 that collectively specify the size, shape, and placement of a profile image. Each of the parameters 206, 208, 210, 212 identifies a respective coordinate in an x-y plane for a rectangle, as indicated by the "rect-" name for the parameters. The parameters 206, 208 specify respective x-values for the left and right edges of the profile image having the rectangular shape, and the parameters 210, 212 specify respective y-values for the top and bottom edges of the profile image having the rectangular shape. The example depicted in FIG. 2 also includes parameters 214, 216, 218, 220 that collectively specify the size, shape, and placement of a cover image. Each of the parameters 214, 216, 218, 220 identifies a respective coordinate in an x-y plane for a rectangle, as indicated by the "rect-" name for the parameters. The parameters 214, 216 specify respective x-values for the left and right edges of the cover image having the rectangular shape, and the parameters 218, 220 specify respective y-values for the top and bottom edges of the cover image having the rectangular shape.

FIG. 3 is a diagram depicting an example of multi-image content 110 that is laid out in accordance with the example of FIG. 2. For illustrative purposes, FIG. 3 depicts an x-y plane with dashed lines that identify the left, right, top, and bottom edges of the images 112, 114 in the x-y plane. The multi-image content 110 includes image content 114 (e.g., a profile image) that is laid out using the parameters 206, 208, 210, 212. The multi-image content 110 also includes image content 112 (e.g., a cover image) that is laid out using the parameters 214, 216, 218, 220.

Figure 4:
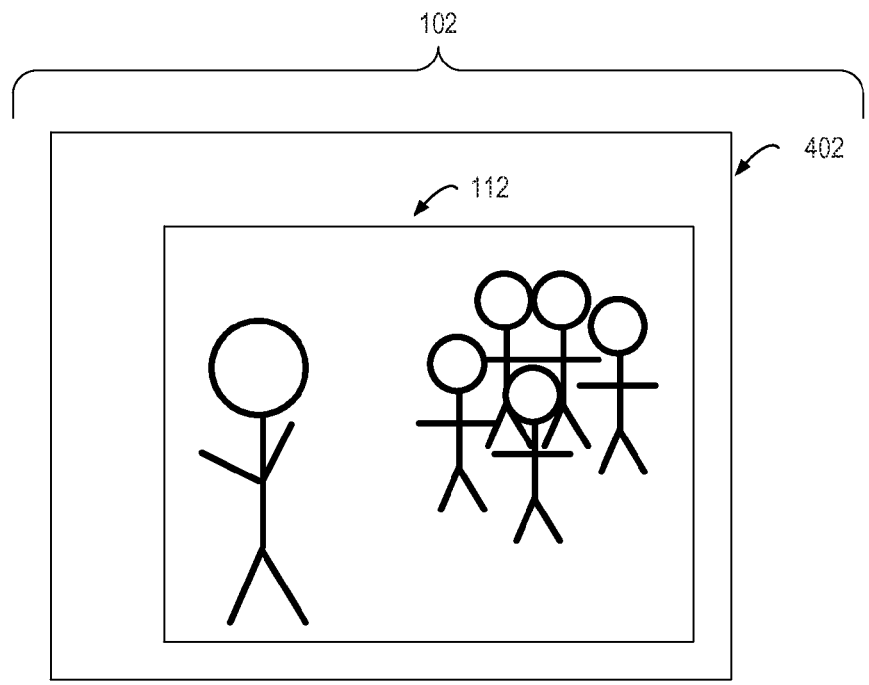
FIG. 4 is a diagram depicting an example of an interface for generating multi-image content from an image according to certain exemplary embodiments.

FIG. 4 is a diagram depicting an example of an interface 402 for generating multi-image content 110 from an input image 104. A processing device of the computing system 100 generates the interface 402 and configures a display device to present the interface 402. In some embodiments, the content editing application 102 responds to one or more selection inputs by identifying an image 104 stored in a non-transitory computer-readable medium that is accessible to the computing system 100. The identified image is used as an input image 104 from which additional images 112, 114 are generated for uploading to the online service 120. In some embodiments, the content editing application 102 copies the selected input image 104 to generate an image 112 that is presented in the interface 402 for editing. These embodiments allow an input image 104 to be used as the basis for generated images 112, 114 without performing destructive edits on the input image 104. In other embodiments, the content editing application 102 is used to edit the selected input image 104 itself via the interface 402.

The content editing application 102 generates the image 112 using a layout 106. In one example, the content editing application 102 responds to the selection of an input image 104 or another suitable command by accessing a layout 106 (e.g., a layout providing a canvas for cover images in a social media service). The layout 106 includes publishing constraints for an image category used by the online service 120. The content editing application 102 formats or otherwise modifies the size, shape, and/or other content copied from the input image 104 in accordance with the accessed layout 106. The content editing application 102 stores the modified image content to an image file for the image 112.

In some embodiments, a layout 106 can be modified. For example, the layout 106 may include one or more modifiable files having one or more rules for implementing one or more publishing constraints of an online service. The content editing application 102 accesses a layout 106 for generating cover images 112 for the online service 120. The content editing application 102 generates the image 112 by applying one or more rules specified in the layout 106 for modifying an input image 104 to comply with the publishing constraints associated with cover images. For example, if the layout 106 specifies a given size and/or shape (e.g., using one or more of the coordinates depicted in FIG. 2), the content editing application 102 can crop, shrink, or otherwise modify an input image 104 to generate the image 112 in accordance with the layout 106.

The layout 106 can be used by to manage changes to publishing constraints associated with the online service 120 without requiring interaction by an end user of the content editing application 102. For example, the online service 120 may be social media service that uses, at a first point in time, a first arrangement of a cover image and a profile image (e.g., a location of the profile image with respect to the cover image) in a user profile. The layout 106 includes one or more rules or other data that is used by the content editing application 102 to arrange a cover image 112 and a profile image 114. At a second point in time, the social media service can use a second arrangement of the cover image and the profile image in the user profile. The rules or other data in the layout 106 can be modified to correspond to the second arrangement. Other characteristics used by the social media service to display cover images or profile images, such as shapes of the cover image and the profile image (e.g., circular, rectangular with rounded corners, etc.) can also be captured in the rules or other data of the layout 106.

Using a separate online service to manage the modification of layouts 106 can allow a content application 102 to use accurate publishing constraints for a given online service 120 at a given point in time. For example, a separate online service, such as an online content manipulation service, may be used to maintain one or more layouts 106 that specify publishing constraints associated with one or more social media services or other online services 120. The content manipulation service may be used to update rules or other data in the layout 106 to reflect changes in publishing constraints associated with a given social media service. The online content manipulation service can make the updated layout 106 available to the content application 102 via a website. The content application 102 can download the updated layout 106 (e.g., one or more XML files) when a user indicates a desire to generate multi-image content 110 for the social media service.

One or more modifiable layouts 106 can be stored in a non-transitory computer-readable medium that is accessible to the content editing application 102. In some embodiments, the non-transitory computer-readable medium is included in one or more additional server systems separate from the server system 118. The additional server systems provide an additional online service (e.g., an image editing service) that is separate from the online service 120 (e.g., a social media service). The additional online service is accessible via one or more data networks 116 (e.g., the Internet) to obtain or use a modifiable layout 106 for generating images in accordance with publishing constraints imposed by an online service 120. In additional or alternative embodiments, the non-transitory computer-readable medium is included in the computing system 100. In one example, the computing system 100 is included in a set of servers or other computing devices that provide an additional online service (e.g., an image editing service) that is separate from the online service 120 (e.g., a social media service). The additional online service is accessible by clients via one or more data networks 116 (e.g., the Internet) to generate images for an online service 120.

In some embodiments, generating multi-image content 110 from a single input image 104 involves generating the image 112 from the input image 104 and then generating an image 114 from a portion of the image 112. The image 112 can be a modified version of the image 104 that complies with a first set of publishing constraints (e.g., publishing constraints for cover images of a social media service), and the image 114 can be a modified version of an image portion from image 112. Using an image portion from the generated image 112 to generate the image 114 can allow a visual relationship between the images 112, 114 to be easily discerned (e.g., because both images have related content).

Figure 5:
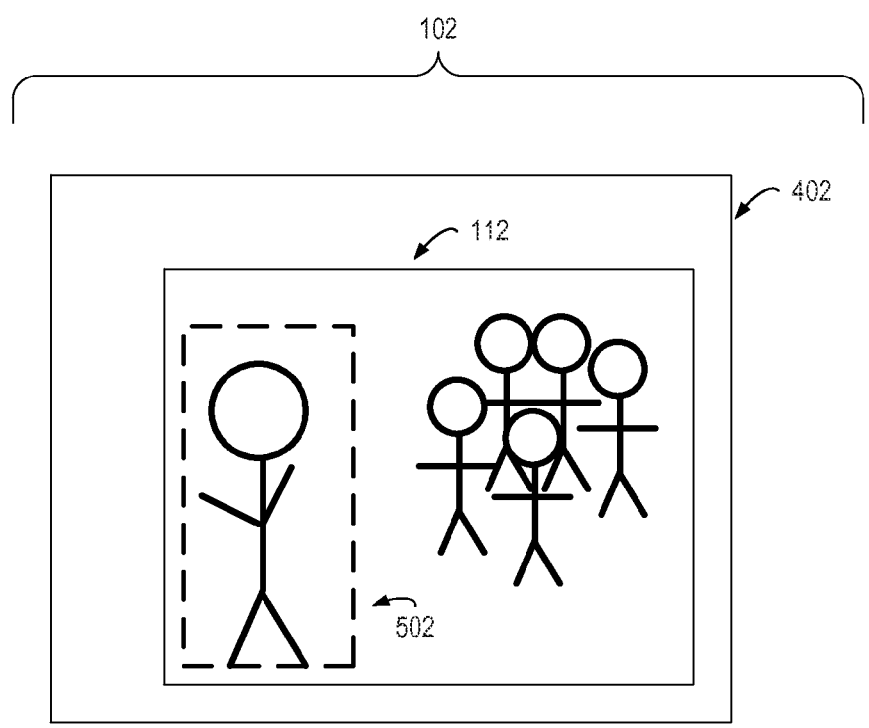
FIG. 5 is a diagram depicting an example of using the interface to select a portion of an image used for generating multi-image content according to certain exemplary embodiments.

FIG. 5 is a diagram depicting an example of using the interface 402 to select a portion 502 of an image 112 used for generating multi-image content. A user of the content editing application 102 can select the portion 302 using a selection graphic or other interface command provided by the content editing application 102. For example, FIG. 5 depicts a dashed rectangle that is a selection graphic visible to a user of the content editing application 102 when selecting an image portion 502. Any suitable input or set of user inputs (e.g., mouse inputs, keyboard inputs, touch screen inputs, etc.) can be used to activate the selection graphic or other interface command. In some embodiments, the content editing application 102 customizes the selection graphics or other interface commands based on publishing constraints for the layout 106. For example, if the layout 106 specifies certain dimensions such that the image 114 will have a certain height-width ratio, the selection graphic or other interface command provided by the content editing application 102 is limited to selecting an image portion 302 having the same height-width ratio. In another example, the selection graphic or other interface command can be otherwise limited to selecting a size, shape, dimensions, or other attribute that correspond to a size, shape, dimensions, or other attribute specified in or identifiable from the layout 106.

In some embodiments, the content editing application 102 provides a separate interface (e.g., an interface labeled "create") for applying one or more effects to the selected portion 502. In one example, inputs received by the content editing application 102 in the interface 402 are used to select a "Quick Edit" command or other command from a menu presented in the interface 402. Examples of menus presented in the interface 402 include a persistent menu displayed in the interface 402, a contextual menu displayed in response to a right-click or other suitable input with respect to the selected portion 502, etc. In one example, the selected command indicates that the selected portion 502 is to be opened in a separate interface for editing.

Figure 6:
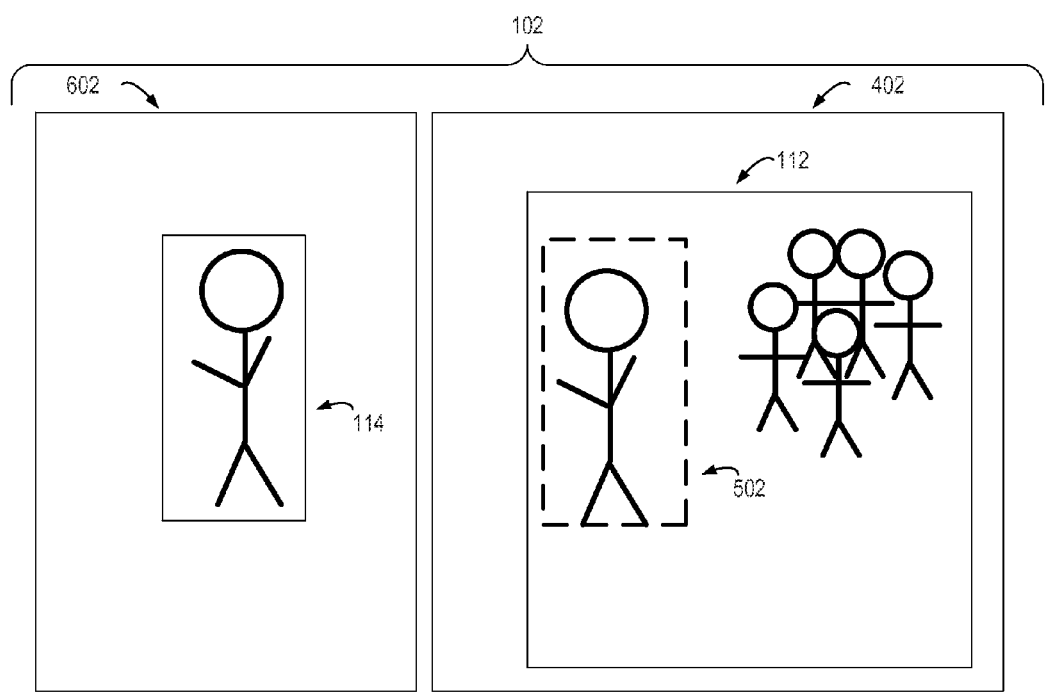
FIG. 6 is a diagram depicting an example of an interface for manipulating a selected portion of an image used for generating multi-image content according to certain exemplary embodiments.

In some embodiments, the content editing application 102 responds to the selected command by opening a separate interface for editing or manipulating a selected portion 502 of an image 112. For example, FIG. 6 is a diagram depicting an example of an interface 602 that is used for generating multi-image content using an image 114 generated from a selected portion 502 of an image 112. A processing device of the computing system 100 generates the interface 602 and configures a display device to present the interface 602. The content editing application 102 accesses a layout 106 in response to receiving a command to present the selected portion 502 in the interface 602. The layout 108 includes publishing constraints for an image category used by the online service 120. In some embodiments, the layout 108 also includes, for example, one or more themes to be applied to an image 114. These themes may be predefined, customized using content editing application 102, or some combination thereof. The content editing application 102 is used for modifying image content copied from a selected portion 502 in accordance with the layout 108. The content editing application 102 saves the modified image content as an image file for the image 114.

Figure 7:
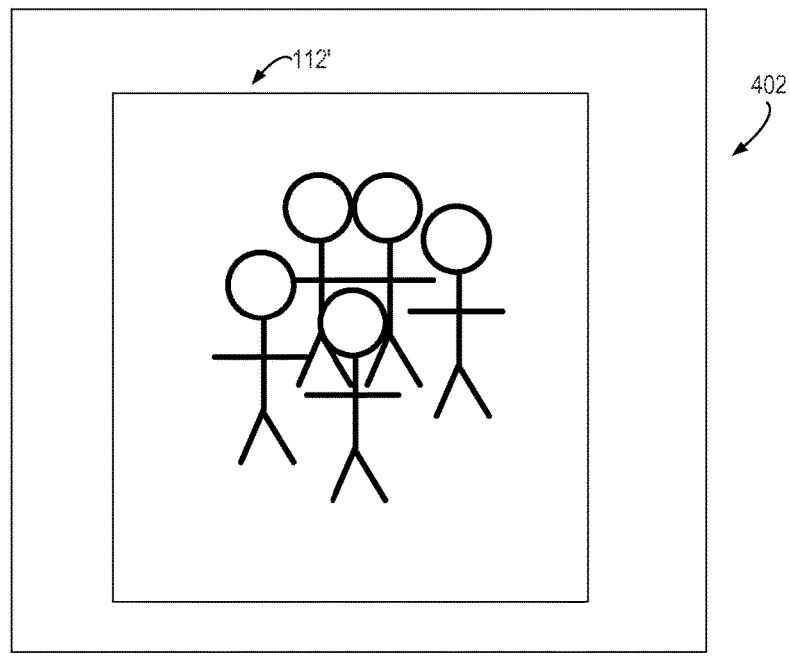
FIG. 7 is a diagram depicting an example of a content-filling effect that is applied to a portion of an image used for generating multi-image content according to certain exemplary embodiments.

The interface 402 can be used to modify the generated image 112 in accordance with one or more publishing constraints. In some embodiments, the user of the content editing application 102 can specify that a portion of the image 112 other than the selected portion 502 used for the image 114 is to be expanded or otherwise modified to fill a portion of the layout 106 corresponding to the image 112. For example, FIG. 7 is a diagram depicting an example of a content-filling effect that is applied to a portion of an image 112 used for generating multi-image content 110. As depicted in FIG. 7, the selected image portion 502 (which forms the basis for image 114) has been removed from the image 112, at least some of the remaining image content has been resized in accordance with the layout 106. For example, if image 112 is a cover image and image 114 is a profile image, the profile image portion is removed from the image 112 and the remaining image content is modified to fill a portion of the layout 106 corresponding to the cover image. The modified version of image 112 is depicted as image 112' in FIG. 7.

Figure 8:
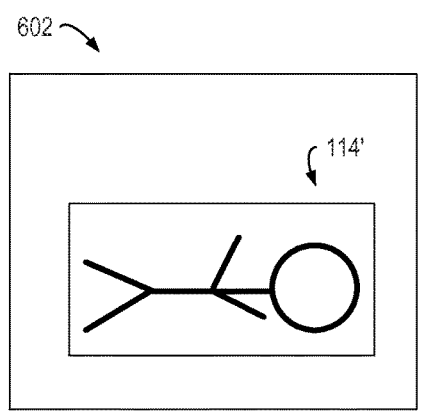
FIG. 8 is a diagram depicting an example of a rotation effect applied to a selected portion of an image used for generating multi-image content according to certain exemplary embodiments.
Figure 9:
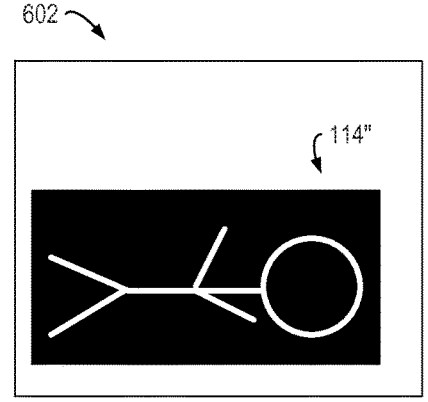
FIG. 9 is a diagram depicting an example of a color manipulation effect applied to a selected portion of an image used for generating multi-image content according to certain exemplary embodiments.

The interface 602 can be used to modify the generated image 114. The interface 602 presents one or more modified versions of the image 114 that are generated by applying one or more manipulation effects to the image 114 (e.g., rotation, zooming, color manipulation, etc.). For example, FIG. 8 is a diagram depicting an example of a rotation effect applied to the image 114 in the interface 602. An application of the rotation effect to the image 114 generates a modified image 114'. FIG. 9 is a diagram depicting an example of a color manipulation effect applied to the image 114'. An application of the color manipulation effect to the image 114' generates a modified image 114". For example, as depicted in FIG. 9, the color manipulation effect inverts the colors of the image 114' to generate the image 114". Other examples of color manipulation effects include (but are not limited to) converting an image 114 from color to black-and-white, modifying the contrast in the image 114, modifying a brightness in the image 114, selectively blurring one or more portions of the image 114, modifying a transparency for one or more portions of the image 114, etc.

Figure 10:
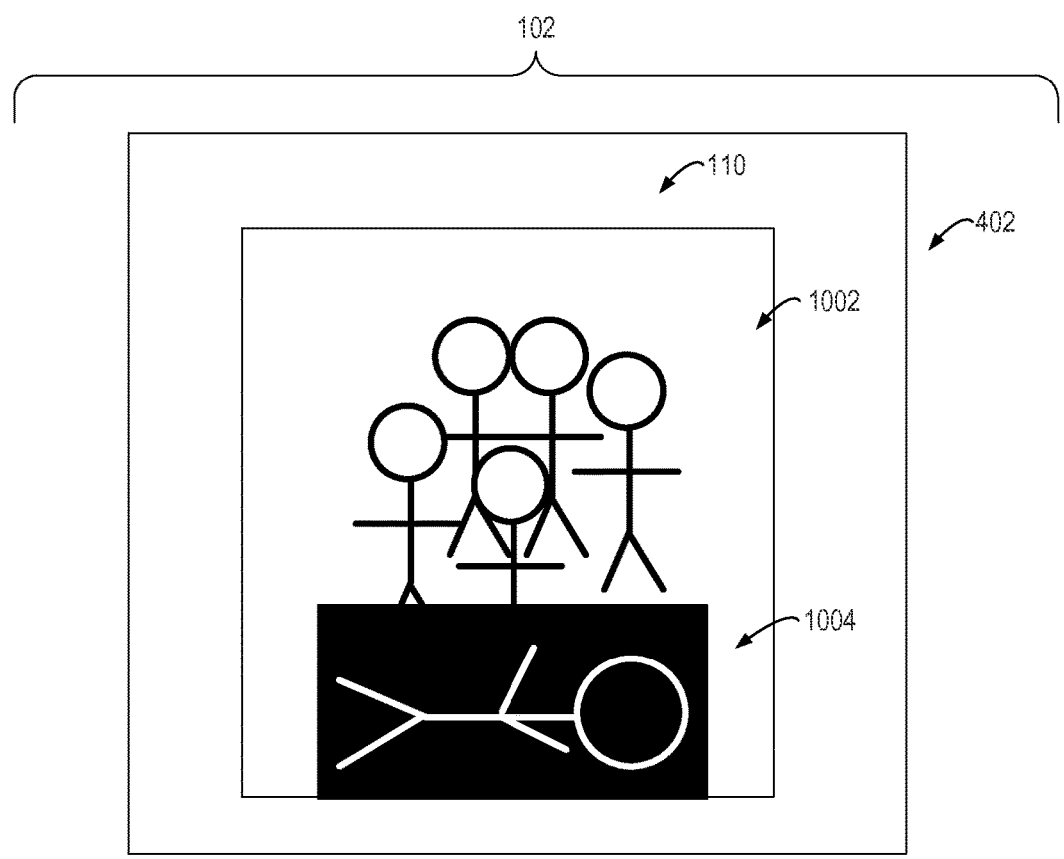
FIG. 10 is a diagram depicting an example of multi-image content generated from an image and a portion of the image to which one or more effects has been applied according to certain exemplary embodiments.

FIG. 10 is a diagram depicting an example of multi-image content 110 generated from an input image 104. The multi-image content 110 is displayed in the interface 402. The example of multi-image content 110 depicted in FIG. 10 includes image portions 1002, 1004. Effects have been applied to the image portion 1004 depicted in FIG. 10 that are different than one or more effects (if any) applied to the image portion 1002. For example, the image portion 1002 includes some or all of the image 112' that is depicted in FIG. 7, and the image portion 1004 includes some or all of the image 114" that is generated by applying one or more manipulation effects to the image 114, as depicted in FIGS. 8 and 9.

In some embodiments, the content editing application 102 generates the multi-image content 110 by combining a first image 112' including the image content 1002 and a second image 114" including the image content 1004 into a multi-layer image. One example of combining a first image 112' including the image content 1002 and a second image 114" including the image content 1004 into a multi-layer image is to generate a new multi-layer image in which pixels for a first layer are obtained from the first image 112 and pixels for a second layer are obtained from the second image 112. For example, the content editing application 102 accesses data stored in a non-transitory computer-readable medium that includes digital image files for images 112', 114". The content editing application 102 generates a new image file for the multi-image content 110 that defines, for each pixel, area coordinates (e.g. x-y coordinates) and a layer coordinate (e.g. a z-coordinate). In a multi-layer image, two sets of image content from the respective images 112', 114" are positioned relative to one another so that pixels from different images are "on top" of one another. For example, pixels in a set of x-y coordinates corresponding to a first layer (i.e., with a first value for a z-coordinate) are obtained from the image 112', and pixels in a set of x-y coordinates corresponding to a first layer (i.e., with a first value for a z-coordinate) are obtained from the image 114".

In additional or alternative embodiments, the content editing application 102 generates the multi-image content 110 without using layer-based editing. For example, the content editing application 102 generates a new image file for the multi-image content 110 that includes copies of each pixel in the image 112'. The content editing application 102 replaces a subset of the pixels in the image 112' with at least some of the pixels from the image 114". For example, a subset of the pixels in a rectangular portion of the image 112' with equal or proportional dimensions as the image 114" can be replaced with pixels from the image 114".

The multi-image content 110 depicted in FIG. 10 is provided for purposes of illustration. Any suitable multi-image content 110 can be generated from an input image 104. For example, multiple portions of an image 112 can be selected in the interface 402 and modified using the interface 602. Any number of image manipulations can be applied to any selected portion of an input image 104. Any suitable type of image manipulation (or lack thereof) can be applied to a selected portion of an image 112. Any suitable type of image manipulation (or lack thereof) can be applied to a selected portion of an image 114.

Figure 11:
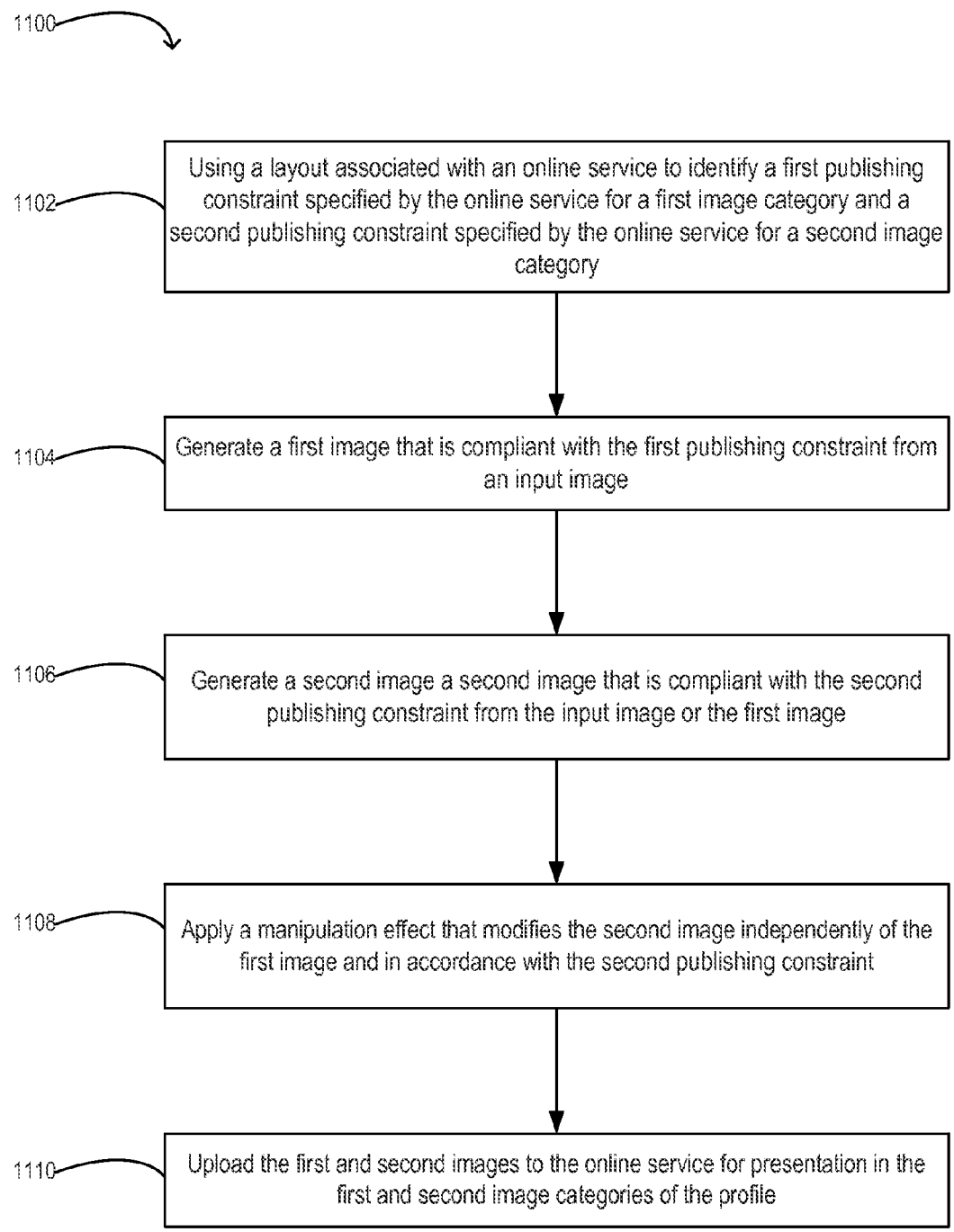
FIG. 11 is a flow chart depicting an example of a method for generating multi-image content for online services using a single image according to certain exemplary embodiments.
Figure 12:
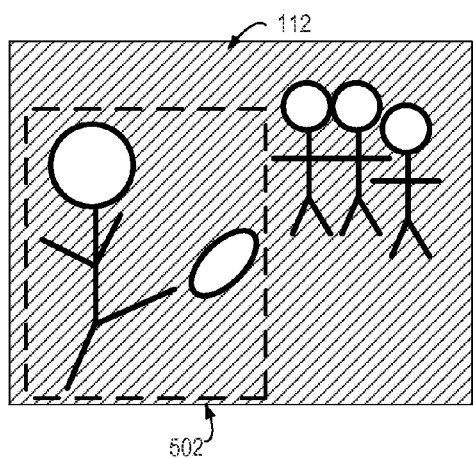
FIG. 12 is a diagram depicting an example of an image that can be used to generate multi-image content according to certain exemplary embodiments.

FIG. 11 is a flow chart depicting an example of a method 1100 for generating multi-image content 110 for an online service 120 using a single input image 104. For purposes of illustration, the method 1100 is described with respect to the embodiments and examples described above with respect to FIGS. 1-7. Other implementations, however, are possible.

The method 1100 involves using a layout associated with an online service to identify a first publishing constraint specified by the online service for a first image category and a second publishing constraint specified by the online service for a second image category, as depicted in block 1102. For example, a suitable processing device of the computing system 100 executes program code, such as one or more components of the content editing application 102, that is stored in a non-transitory computer readable medium. Executing the program code configures the processing device to perform operations for identifying constraints specified by a social media service or other online service 120 for different categories of images in a profile for the social media service or other online service 120.

Publishing constraints include one or more types of information associated with images that affect how the images are presented in a profile of the online service 120. In some embodiments, publishing constraints include a set of dimensions for images in a given image category. For instance, a first image category (e.g., cover images) may have first requirements for the height and width of images and a second image category (e.g., profile images) may have second requirements for the height and width of images. In some embodiments, one or more publishing constraints for a first image category are specified relative to one or more publishing constraints or other aspects of images in a second image category. For instance, one or more of the size and position of profile images may be specified relative to the size and position of cover images.

In some embodiments, identifying constraints applied by an online service 120 involves accessing one or more layouts 106. The layout 106 includes information that specifies, identifies, or otherwise indicates publishing constraints for an online service 120. In some embodiments, one or more layouts 106 are provided by an additional online service separate from the online service 120. The content editing application 102 downloads or otherwise accesses the layout 106 from the additional online service via one or more data networks 116. In additional or alternative embodiments, one or more layouts 106 are stored on a non-transitory computer-readable medium at a computing system 100 that executes the content editing application 102. The layout 106 can be downloaded to the non-transitory computer-readable medium from an appropriate online service, generated using the content editing application 102, or some combination thereof. In additional or alternative embodiments, one or more layouts 106 are provided by the online service 120. The content editing application 102 downloads or otherwise accesses the layout 106 from the online service 120 to identify publishing constraints imposed by the online service 120.

Examples of these image categories include cover images and profile images. An example of an image in a cover image category is an image presented in response to a request to access the profile of an online service. For instance, a cover image may be presented by the online service 120 when a user of the online service clicks on a link to the profile. An example of an image in a profile image category is an image presented with a list of search results including the profile. For instance, a profile image may be presented by the online service 120 along with a link to the profile when a user of the online service searches for profiles satisfying one or more search criteria (e.g., profiles matching one or more search terms, profiles that are "friends" of the searching user, profiles associated with a certain group in the online service 120, etc.). In some embodiments, a cover image and a profile image are presented simultaneously when a profile is accessed. Another example of a publishing constraint is a requirement that one of the cover or profile images must be presented in a manner relative to the other of the cover or profile images (e.g., the profile image having a size and position that is specified as relative to the cover image).

The method 1100 also involves generating a first image that is compliant with the first publishing constraint from an input image, as depicted in block 1104. For example, a suitable processing device of the computing system 100 executes program code, such as one or more components of the content editing application 102, that is stored in a non-transitory computer readable medium. Executing the program code configures the processing device to perform operations such as, for example, copying an input image 104 to generate the image 112 and presenting the image 112 in a preview interface 402, as described above with respect to FIG. 4.

The method 1100 also involves generating a second image that is compliant with the second publishing constraint from at least one of the input image or the generated first image, as depicted in block 1106. For example, a suitable processing device of the computing system 100 executes program code, such as one or more components of the content editing application 102, that is stored in a non-transitory computer readable medium. Executing the program code configures the processing device to perform operations for generating a second image 114. In some embodiments, these operations include selecting a portion 502 of the image 112 and generating the image 114 from the selected portion 502, as described above with respect to FIGS. 3 and 4. In additional or alternative embodiments, these operations include selecting a portion of an input image 104 and generating the image 114 from the selected portion of the input image.

In some embodiments, the content editing application 102 generates a separate preview interface 602 for presenting the second image 114. For example, suitable processing device of the computing system 100 executes program code, such as one or more components of the content editing application 102, that is stored in a non-transitory computer readable medium. Executing the program code configures the processing device to generate the preview interface 602 and to cause a display device communicatively coupled to the processing device to display the preview interface 602.

The method 1100 also involves applying a manipulation effect to the second image that modifies the second image independently of the first image and in accordance with the second publishing constraint, as depicted in block 1108. For example, a suitable processing device of the computing system 100 executes program code, such as one or more components of the content editing application 102, that is stored in a non-transitory computer readable medium. Executing the program code configures the processing device to perform operations for manipulating one or more of the images 112, 114 independently of one another in a manner that does not deviate from publishing constraints indicated by one or more of layouts 106.

In some embodiments, the content editing application 102 configures a display device to simultaneously present the preview interfaces 402, 602. The images 112, 114 are displayed in the preview interface 402 in accordance with the layout 106. The processing device responds to receiving modifications to the image 114 via the separate preview interface 602 by updating both preview interfaces 402, 602 with the manipulation effects applied to the image 114. Updating both preview interfaces 402, 602 with the manipulation effects applied to the image 114 provides a preview of the multi-image content 110 that is generated from the images 112, 114 prior to uploading or publication.

In some embodiments, modifying one image independently of modifications to another image involves restricting changes caused by a manipulation effect to a specific image (e.g., by using a separate preview interface 602 to modify the image 114). Examples of modifying an image in accordance with a publishing constraint include (but are not limited to) preventing a manipulation effect from changing the appearance of an image in a manner that fails to comply with the publishing constraint. In one example, the content editing application 102 uses one or more of layouts 106 to prevent modifications to a height and/or width of one or more of the image 112, 114 that would cause the height and/or width to exceed a height and/or width indicated by a publishing constraint in one or more of layouts 106.

One or more of the images 112, 114 can be modified as described above with respect to FIGS. 5 and 6. Examples of manipulation effects include (but are not limited to) rotating one or more of the images 112, 114, modifying color information of one or more of the images 112, 114, modifying a zoom of one or more of the images 112, 114, etc.

Figure 13:
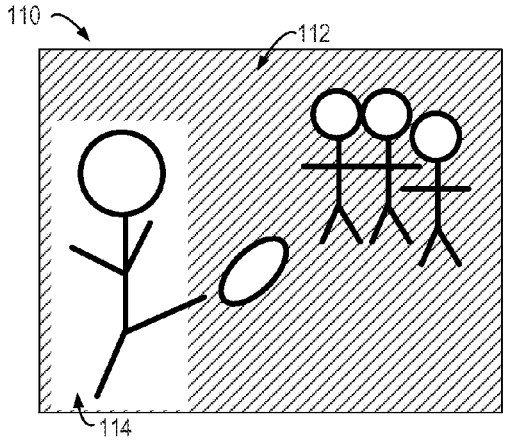
FIG. 13 is a diagram depicting an example of multi-image content generated from the image of FIG. 12 in which content from a first image is displayed in a manner overlapping a second image according to certain exemplary embodiments.
Figure 14:
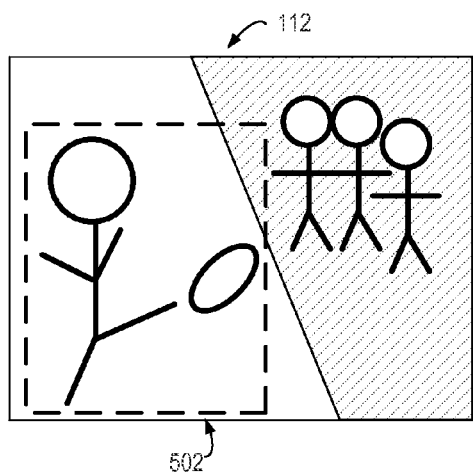
FIG. 14 is a diagram depicting another example of an image that can be used to generate multi-image content according to certain exemplary embodiments.
Figure 15:
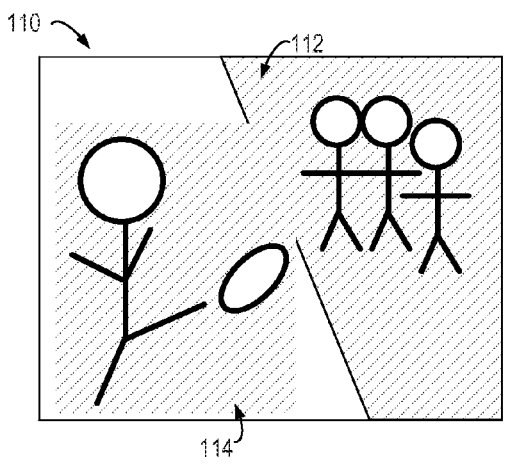
FIG. 15 is a diagram depicting an example of multi-image content generated from the image of FIG. 14 in which content from a first image is selectively blended with content from a second image according to certain exemplary embodiments.

More complex examples of image manipulations involve the manipulations depicted in FIGS. 9-12. In one example depicted in FIG. 12, the content editing application 102 is used to select an image portion 502 that includes a person kicking a football. The image portion 502 can be used to generate an image 114, as described above with respect to FIGS. 3 and 4. Some of the image 114 can be made transparent such that the football from image 114 appears to be included in the image 112 (e.g., "out of bounds" with respect to image 114) when the images 112, 114 are combined in the image content 110, as depicted in FIG. 13. In another example depicted in FIG. 14, the content editing application 102 is used to select an image portion 502 that includes background coloring or other features different from the background coloring or other features of the remainder of the image 112. The image portion 502 is used to generate an image 114, as described above with respect to FIGS. 3 and 4. A manipulation effect applied to the image 114 can selectively blend image 114 with at least a portion of the image 112 such background coloring from the image 112 is included in at least some of the image 114 when the images 112, 114 are combined in the image content 110, as depicted in FIG. 15.

In additional or alternative embodiments, the content editing application 102 utilizes randomized effects and learning algorithms to generate one or more of the images 112, 114. For example, selecting a "Randomize Effect" command can configure the content editing application 102 to randomly select one or more manipulation effects and randomly apply the selected manipulations to one or more of the images 112, 114. Repeatedly selecting the "Randomize Effect" command can cause various combination of manipulations to be applied to one or more of the images 112, 114.

In additional or alternative embodiments, the content editing application 102 automatically detects a subject for profile image 114 from a cover image 112. For example, the subject can be detected in response to a command to generate the cover image 112. Objects at specified positions (e.g., a left-most object, an object nearest a center, a right-most object etc.) are automatically selected as the subject. The content editing application 102 selects a portion of the input image 104 as the subject for the profile image 114, and the content editing application 102 zooms or otherwise manipulates the remainder of the input image 104 to fit a layout 106 for the cover image 112.

In additional or alternative embodiments, the content editing application 102 automatically adjusts a profile image in a selected portion 502 of the image 112. For example, the selected portion 502 of a cover image 112 can be identified as including one or more objects that are to be the focus of a profile image. In the process of generating a profile image 114 from the selected image portion 502, the content editing application 102 can increase or decrease a zoom with respect to one or more objects in the selected image portion 502 such that the one or more objects are the focus of a generated profile image 114. An example of selecting the focus of a generated profile image 114 includes zooming in on the one or more objects (e.g., a person that is the subject of the profile image 114) such that the one or more objects occupy the majority of a generated profile image 114. If there is a portion left between the cover image 112 and the boundary of a canvas or other layout 106, the portion can be filled in a content-aware manner using a single click or other appropriate input. For example, one or more portions of the cover image 112 (e.g., pixels from the cover image 112) can be used to fill the unoccupied portion of the canvas using PatchMatch or another suitable algorithm.

Returning to FIG. 11, the method 1100 also involves uploading the first and second images to the online service for presentation in the first and second image categories of the profile, as depicted in block 1110. For example, a processing device of the computing system 100 executes the content editing application 102 or another suitable application (e.g. a browser application). Executing the content editing application 102 or another suitable application causes the processing device to configure a network interface device of the computing system 100 to transmit data via one or more data networks 116 to a server system 118 that provides an online service 120. The transmitted data includes the multi-image content 110.

Figure 16:
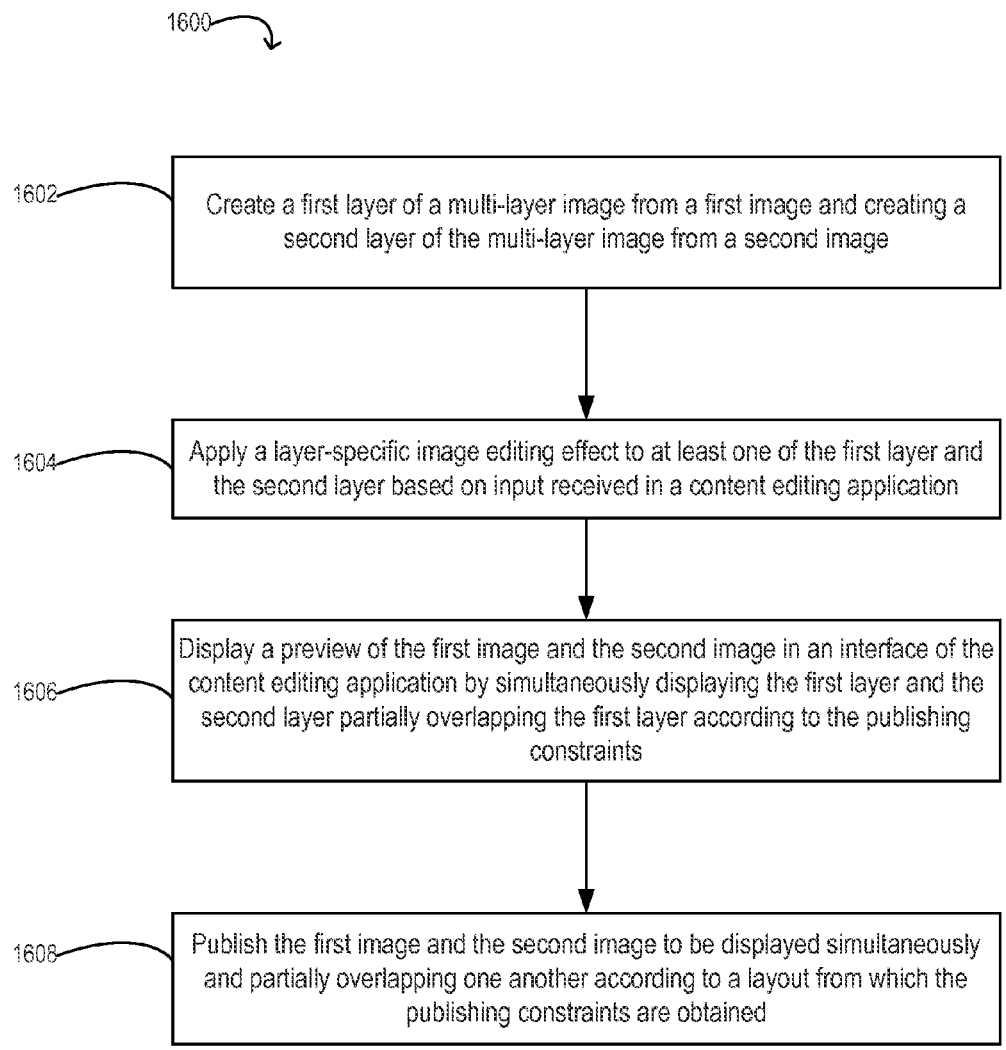
FIG. 16 is a flow chart depicting an example of a method for creating images to be displayed simultaneously and partially overlapping one another according to publishing constraints according to certain exemplary embodiments.

The operations described herein can be used to generate multi-layer images for publication to an online service 120. For example, FIG. 16 is a flow chart depicting an example of a method 1600 for creating images to be displayed simultaneously and partially overlapping one another according to publishing constraints. In various embodiments, the method 1600 is performed in addition to or as an alternative to the method 1100. For purposes of illustration, the method 1600 is described with respect to the embodiments and examples described above with respect to FIGS. 1-9. Other implementations, however, are possible.

The method 1600 involves creating a first layer of a multi-layer image from a first image and creating a second layer of the multi-layer image from a second image, as depicted in block 1602. For example, a suitable processing device of the computing system 100 executes program code, such as one or more components of the content editing application 102, that is stored in a non-transitory computer readable medium. Executing the program code configures the processing device to perform operations for creating a first layer of a multi-layer image from a first image and creating a second layer of the multi-layer image from a second image, such as the operations described above with respect to method 1100.

The method 1600 also involves applying a layer-specific image editing effect to at least one of the first layer and the second layer based on input received in a content editing application, as depicted in block 1604. For example, a suitable processing device of the computing system 100 executes program code, such as one or more components of the content editing application 102, that is stored in a non-transitory computer readable medium. Executing the program code configures the processing device to perform operations for applying a layer-specific image editing effect to at least one of the first layer and the second layer based on input received in a content editing application 102. Examples of these operations include (but are not limited to) using one or more of the interfaces 402, 602 to apply manipulation effects as described above with respect to FIGS. 2-12.

The method 1600 also involves displaying a preview of the first image and the second image in an interface of the content editing application by simultaneously displaying the first layer and the second layer partially overlapping the first layer according to the publishing constraints, as depicted in block 1606. The publishing constraints specify one or more of relative positions, sizes, and shapes for the first image and the second image. For example, a suitable processing device of the computing system 100 executes program code, such as one or more components of the content editing application 102, that is stored in a non-transitory computer readable medium. Executing the program code configures the processing device to perform operations for simultaneously displaying the first layer and the second layer at least partially overlapping the first layer according to the publishing constraints. Examples of these operations include (but are not limited to) one or more of the operations described above with respect to FIGS. 7, 10, and 12.

The method 1600 also involves publishing the first image and the second image to be displayed simultaneously and partially overlapping one another according to a layout from which the publishing constraints are obtained, as depicted in block 1608. For example, a suitable processing device of the computing system 100 executes program code, such as one or more components of the content editing application 102, that is stored in a non-transitory computer readable medium. Executing the program code configures the processing device to perform operations for publishing multi-image content 110 that include a first image 112 and a second image 114. In some embodiments, publishing the multi-image content 110 includes exporting a multi-layer image file that includes the multi-image content 110 from the content editing application 102. Examples of exporting a multi-layer image file include saving the multi-layer image file to a non-transitory computer-readable medium, transmitting the multi-layer image file to a non-transitory computer-readable medium to another computing device, etc. In additional or alternative embodiments, publishing the multi-image content 110 includes using the content editing application 102 or another suitable application (e.g., a web browser) to upload the multi-image content 110 to an online service 120 in a manner similar to that described above with respect to block 1110 in FIG. 11.

Any suitable system can implement the content editing application 102. For example, FIG. 17 is a block diagram depicting an example of a computing system 100 for generating multi-image content for online services using a single image.

Figure 17:
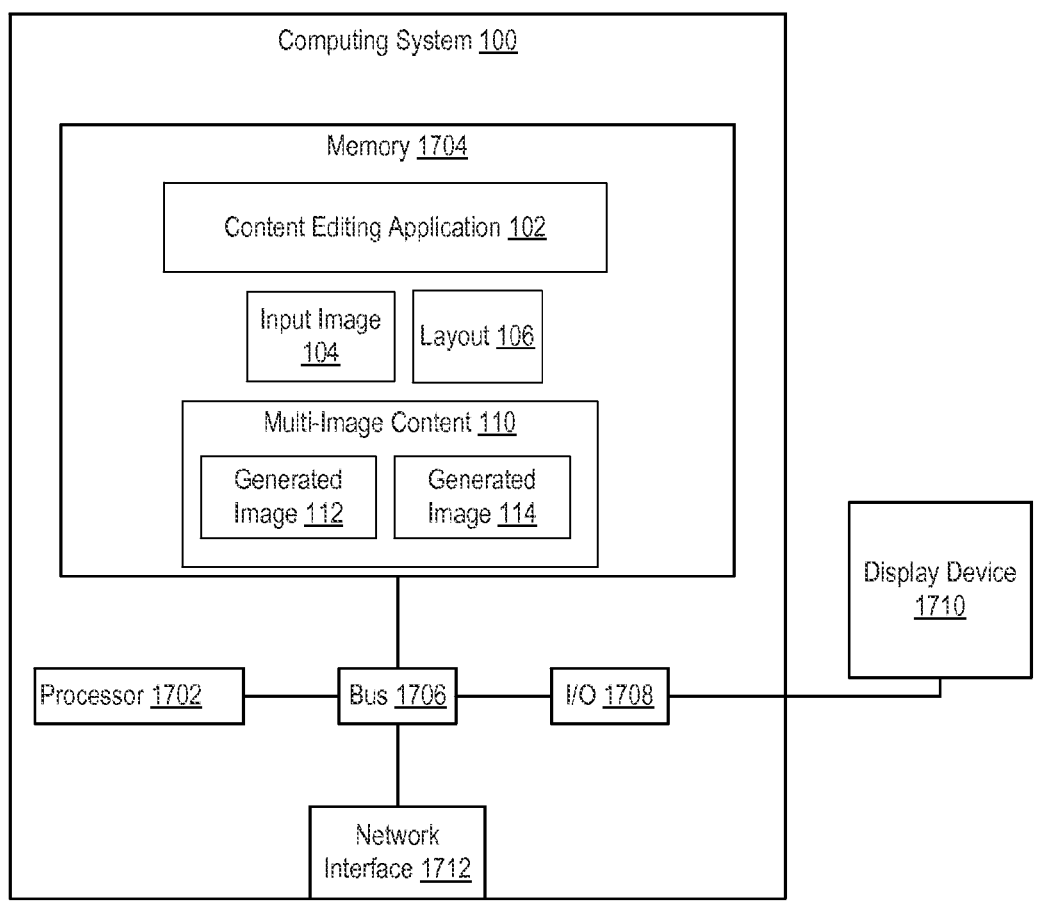
FIG. 17 is a block diagram depicting an example of a computing system for generating multi-image content for online services using a single image according to certain exemplary embodiments.

The computing system 100 depicted in FIG. 17 includes a processor 1702 that is communicatively coupled to a memory 1704 and that executes computer-executable program code and/or accesses information stored in the memory 1704. Examples of the processor 1702 include (but are not limited to) a microprocessor, an application-specific integrated circuit ("ASIC"), a state machine, or other processing device. The processor 1702 can include any of a number of processing devices, including one. In some embodiments, the processor 1702 includes or is communicatively coupled (e.g., via a data bus or other communication device) with a computer-readable medium storing instructions that, when executed by the processor 1702, cause the processor to perform the operations described herein.

The memory 1704 includes any suitable computer-readable medium. The computer-readable medium can be non-transitory. Examples of the computer-readable medium include any electronic, optical, magnetic, or other storage device capable of providing a processor with computer-readable instructions or other program code. Examples of a computer-readable medium include (but are not limited to) a floppy disk, CD-ROM, DVD, magnetic disk, memory chip, ROM, RAM, an ASIC, a configured processor, optical storage, magnetic tape or other magnetic storage, or any other medium from which a computer processor can read instructions. Examples of the instructions include (but are not limited to) processor-specific instructions generated by a compiler and/or an interpreter from code written in any suitable computer-programming language, including, for example, C, C++, C#, Visual Basic, Java, Python, Perl, JavaScript, and ActionScript.

In some embodiments, the computing system 100 also includes a number of external or internal devices such as input or output devices. For example, the computing system 100 is shown with an input/output ("I/O") interface 1708 that receives input from input devices and/or provides output to output devices, such as a display device 1710. A bus 1706 is also included in the computing system 100. The bus 1706 communicatively couples one or more components of the computing system 100.

The computing system 100 executes program code that configures the processor 1702 to perform one or more of the operations described herein. An example of the program code is the content editing application 102. The program code is stored in the memory 1704 or any suitable computer-readable medium and is executable by the processor 1702 or any other suitable processor. In some embodiments, the input image 104 and the layout 106 are resident in the memory 1704, as depicted in FIG. 17. In additional or alternative embodiments, the input image 104 and the layout 106 are resident in a memory device remote from the computing system 100 and accessible to the computing system 100 via one or more data networks 116.

The computing system 100 depicted in FIG. 17 also includes at least one network interface 1712. The network interface 1712 includes any device or group of devices suitable for establishing a wired or wireless data connection to one or more data networks 116. Non-limiting examples of the network interface 1712 include an Ethernet network adapter, a modem, and/or the like. The computing system 100 is able to communicate with one or more server systems 118 using the network interface 1712.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
    detecting, by an image manipulation application in communication with an online content manipulation service, a first input from a user indicating a desire to generate multi-image content for a social media service that is independent of the online content manipulation service;
    using, by the image manipulation application and responsive to the first input, the online content manipulation service to retrieve or update a layout specific to the social media service, wherein the layout is retrieved or updated via communications between the online content manipulation service and the social media service;
    identifying, by the image manipulation application and from the retrieved or updated layout, a first publishing constraint specified by the social media service for a first image category and a second publishing constraint specified by the social media service for a second image category, wherein the first publishing constraint and the second publishing constraint specify (i) relative positions of a first image in a profile of the social media service and a second image in the profile of the social media service and (ii) a size and shape for the first image and a size and shape for the second image;
    generating, by the image manipulation application, the first image that is compliant with the first publishing constraint from an input image and generating the second image that is compliant with the second publishing constraint from at least one of the input image or the generated first image;

creating, by the image manipulation application, (i) a first layer of a multi-layer image from the first image and (ii) a second layer of the multi-layer image from the second image;

applying, by the image manipulation application, a manipulation effect to the second image that modifies the second image independently of the first image and in accordance with the second publishing constraint, wherein applying the manipulation effect to the second image comprises applying a layer-specific image editing effect to the second layer based on a second input received by the image manipulation application;

displaying a preview of the first image and the second image in an interface of the image manipulation application by simultaneously displaying, according to the first publishing constraint and the second publishing constraint, (i) the first layer and (ii) the second layer partially overlapping the first layer, wherein the layer-specific image editing effect is shown in the preview;

publishing the first image and the second image to be displayed simultaneously and partially overlapping one another according to the layout; and uploading, by the image manipulation application, the first image and the second image with the applied manipulation effect to the social media service, wherein the first image is uploaded for presentation in the first image category of the profile and the second image is uploaded for presentation in the second image category of the profile.

2. The method of claim 1, wherein the first publishing constraint comprises a first set of dimensions for images in the first image category and the second publishing constraint comprises a second set of dimensions for images in the second image category.

3. The method of claim 2, wherein the first image category comprises a cover image category for images presented in response to a request to access the profile and the second image category comprises a profile image category for images presented with a list of search results including the profile.

4. The method of claim 2, wherein modifying the second image in accordance with the second publishing constraint comprises preventing the manipulation effect from modifying at least one of a height or width of the second image to exceed at least one of a height or width specified in the second set of dimensions.

5. The method of claim 2, wherein modifying the second image independently of the first image comprises restricting changes caused by the manipulation effect to the second image.

6. The method of claim 1, further comprising applying an additional manipulation effect to the first image that modifies the first image independently of the second image and in accordance with the first publishing constraint, wherein the first image is uploaded to the social media service with the additional manipulation effect applied to the first image.

7. The method of claim 1, wherein the manipulation effect comprises at least one of rotating the second image, modifying color information of the second image, and modifying a zoom of the second image.

8. The method of claim 1, wherein the layout is updated, with the image manipulation application, independently of user input other than the detected first input.

9. The method of claim 1, wherein the layout is updated, with the image manipulation application, independently of user input other than the detected first input, wherein the method further comprises:

detecting, by the image manipulation application and subsequent to uploading the first image and the second image, additional input indicating a desire to generate additional multi-image content for the social media service;

using, by the image manipulation application and responsive to the additional input, the online content manipulation service to update the layout associated with the social media service, wherein the image manipulation application updates the layout independently of user input other than the detected additional input;

identifying, by the image manipulation application and from the retrieved or updated layout, a first updated publishing constraint specified by the social media service for the first image category and a second updated publishing constraint specified by the social media service for the second image category;

generating, by the image manipulation application, a first additional image that is compliant with the first updated publishing constraint from an additional input image and generating a second additional image that is compliant with the second updated publishing constraint from at least one of the additional input image or the generated first additional image;

applying, by the image manipulation application, a manipulation effect to the second additional image that modifies the second additional image independently of the first additional image and in accordance with the second updated publishing constraint; and uploading, by the image manipulation application, the first additional image and the second additional image with the applied manipulation effect to the social media service, wherein the first additional image is uploaded for presentation in the first image category and the second additional image is uploaded for presentation in the second image category.

10. A system comprising:
a processing device; and
a non-transitory computer-readable medium communicatively coupled to the processing device,
wherein the processing device is configured to execute an image manipulation application stored in the non-transitory computer-readable medium and to thereby perform operations comprising:
communicating with an online content manipulation service,
detecting a first input from a user indicating a desire to generate multi-image content for a social media service that is independent of the online content manipulation service,
using, responsive to the first input, the online content manipulation service to retrieve or update a layout specific to the social media service, wherein the layout is retrieved or updated via communications between the online content manipulation service and the social media service,
identifying, from the retrieved or updated layout, a first publishing constraint specified by the social media service for a first image category and a second publishing constraint specified by the social media service for a second image category, wherein the first publishing constraint and the second publishing constraint specify (i) relative positions of a first image in a profile of the social media service and a second image in the profile of the social media service and (ii) a size and shape for the first image and a size and shape for the second image, generating the first image that is compliant with the first publishing constraint from an input image and generating the second image that is compliant with the second publishing constraint from at least one of the input image or the generated first image, creating (i) a first layer of a multi-layer image from the first image and (ii) a second layer of the multi-layer image from the second image, applying a manipulation effect to the second image that modifies the second image independently of the first image and in accordance with the second publishing constraint, wherein applying the manipulation effect to the second image comprises applying a layer-specific image editing effect to the second layer based on a second input received by the image manipulation application, displaying a preview of the first image and the second image in an interface of the image manipulation application by simultaneously displaying, according to the first publishing constraint and the second publishing constraint, (i) the first layer and (ii) the second layer partially overlapping the first layer, wherein the layer-specific image editing effect is shown in the preview, publishing the first image and the second image to be displayed simultaneously and partially overlapping one another according to the layout, and uploading the first image and the second image with the applied manipulation effect to the social media service, wherein the first image is uploaded for presentation in the first image category of the profile and the second image is uploaded for presentation in the second image category of the profile.

11. The system of claim 10, wherein the first publishing constraint comprises a first set of dimensions for images in the first image category and the second publishing constraint comprises a second set of dimensions for images in the second image category.

12. The system of claim 11, wherein modifying the second image in accordance with the second publishing constraint comprises preventing the manipulation effect from modifying at least one of a height or width of the second image to exceed at least one of a height or width specified in the second set of dimensions.

13. The system of claim 11, wherein modifying the second image independently of the first image comprises restricting changes caused by the manipulation effect to the second image.

14. The system of claim 10, wherein the operations further comprise applying an additional manipulation effect to the first image that modifies the first image independently of the second image and in accordance with the first publishing constraint, wherein the first image is uploaded to the social media service with the additional manipulation effect applied to the first image.

15. A non-transitory computer-readable medium comprising program code that is executable by a processing device to perform operations comprising:

detecting, by an image manipulation application in communication with an online content manipulation service, first input from a user indicating a desire to generate multi-image content for a social media service that is independent of the online content manipulation service;

using, by the image manipulation application and responsive to the first input, the online content manipulation service to retrieve or update a layout specific to the social media service, wherein the layout is retrieved or updated via communications between the online content manipulation service and the social media service;

identifying, by the image manipulation application and from the retrieved or updated layout, a first publishing constraint specified by the social media service for a first image category and a second publishing constraint specified by the social media service for a second image category, wherein the first publishing constraint and the second publishing constraint specify (i) relative positions of a first image in a profile of the social media service and a second image in the profile of the social media service and (ii) a size and shape for the first image and a size and shape for the second image;

generating, by the image manipulation application, the first image that is compliant with the first publishing constraint from an input image and generating the second image that is compliant with the second publishing constraint from at least one of the input image or the generated first image;

creating, by the image manipulation application, (i) a first layer of a multi-layer image from the first image and (ii) a second layer of the multi-layer image from the second image;

applying, by the image manipulation application, a manipulation effect to the second image that modifies the second image independently of the first image and in accordance with the second publishing constraint, wherein applying the manipulation effect to the second image comprises applying a layer-specific image editing effect to the second layer based on a second input received by the image manipulation application;

displaying a preview of the first image and the second image in an interface of the image manipulation application by simultaneously displaying, according to the first publishing constraint and the second publishing constraint, (i) the first layer and (ii) the second layer partially overlapping the first layer, wherein the layer-specific image editing effect is shown in the preview;

publishing the first image and the second image to be displayed simultaneously and partially overlapping one another according to the layout; and uploading, by the image manipulation application, the first image and the second image with the applied manipulation effect to the social media service, wherein the first image is uploaded for presentation in the first image category of the profile and the second image is uploaded for presentation in the second image category of the profile.

* * * * *